United States Patent
Okura et al.

(10) Patent No.: US 6,476,083 B1
(45) Date of Patent: Nov. 5, 2002

(54) ALUMINA DISPERSANT, ALUMINA DISPERSION LIQUID, AGENT FOR TREATING INKJET-PRINTING MATERIALS, AND INKJET-PRINTING MATERIALS

(75) Inventors: Kousuke Okura, Hiratsuka (JP); Tetsuya Ochiai, Fujisawa (JP); Kenji Kawada, Yokohama (JP)

(73) Assignee: Taiho Industries Co., Ltd., Tokyo (JP)

( * ) Notice: Subject to any disclaimer, the term of this patent is extended or adjusted under 35 U.S.C. 154(b) by 0 days.

(21) Appl. No.: 09/310,143

(22) Filed: May 12, 1999

(30) Foreign Application Priority Data

| May 15, 1998 | (JP) | 10-133825 |
| Oct. 6, 1998 | (JP) | 10-284509 |

(51) Int. Cl.⁷ .............................. B01F 17/00
(52) U.S. Cl. .................. 516/93; 106/286.5; 428/195; 524/238; 524/430
(58) Field of Search .............. 576/93; 106/286.5; 524/238, 430

(56) References Cited

U.S. PATENT DOCUMENTS

| 3,896,046 A | * | 7/1975 | Carstens et al. | 516/93 |
| 4,100,096 A | * | 7/1978 | Rubin | 516/93 X |
| 4,624,812 A | * | 11/1986 | Farrow et al. | 524/430 X |
| 5,859,108 A | * | 1/1999 | Shinohara | 524/430 |
| 5,928,127 A | * | 7/1999 | Tanuma | 516/93 |

FOREIGN PATENT DOCUMENTS

| JP | 0 213752 | * 12/1984 | 524/238 |
| JP | 60 245588 | 12/1985 | |
| JP | 1 083668 | * 4/1986 | 524/430 |
| JP | 7 2430 | 11/1990 | |

* cited by examiner

Primary Examiner—Richard D. Lovering
(74) Attorney, Agent, or Firm—Browdy and Neimark, P.L.L.C.

(57) ABSTRACT

This invention provides an alumina dispersant mainly comprised of a nitrogen-containing monocarboxylic acid, an alumina dispersion liquid comprised of alumina particles dispersed well in an aqueous dispersing medium, a treating agent for use in making inkjet-printing materials, comprised of the alumina dispersion, and the inkjet-printing materials prepared by using the treating agent to have a high glossiness, high absorption, high water resistance, high reproducibility and good roundness of dots.

16 Claims, No Drawings

ALUMINA DISPERSANT, ALUMINA DISPERSION LIQUID, AGENT FOR TREATING INKJET-PRINTING MATERIALS, AND INKJET-PRINTING MATERIALS

BACKGROUND OF THE INVENTION

1. Field of the Invention

The present invention relates to alumina dispersant, alumina dispersion liquid, agent for treating inkjet-printing materials, and inkjet-printing materials, more particularly alumina dispersion liquid being unchanged in viscosity for long term, dispersing alumina uniformly and having no smell, alumina dispersant for preparing such excellent alumina dispersion liquid, agent for being used to produce printing material having high glossiness, high absorption for ink, high water-resistance, and good reproducibility and roundness of dots of ink printed on the materials by inkjet-printer, and an inkjet-printing material treated with the agent.

2. Description of Related Art

Many kinds of solid-liquid dispersions comprising a liquid containing fine solid particles dispersed therein are recently seen in many products or production processes. The solid-liquid dispersion products using alumina or alumina hydrate as the fine solid particles are, for example, an abrasive slurry, thickening agent for ink or paint, tooth paste, domestic cleaner and wax. The solid-liquid dispersions used in the production processes are, for example, a coating dispersion to be applied on printing materials for using in inkjet-printing, for example, OHP films, glossy films or glossy papers, and a liquid for using in kneading abrasive grains.

The dispersibility of fine particles in various slurries used in these products or production processes is very important.

For example, it is a known problem that abrading a work surface with an abrasive slurry having a poor dispersibility of abrasives such as alumina particles causes scratches to form on the work surface. Furthermore. it is a problem that the poor dispersibility of fine particles in dispersion products such as a cleaner or wax, which are sold in various containers such as a spray can or aerosol can, causes the dispersion products to be thickened. there are further problems as follows: (1) fine particles in a dispersion are aggregated into aggregates during short-term; (2) such aggregates clog spraying nozzles of spray coating cans or aerosol coating cans; (3) the aggregates are settled on the bottoms of containers for dispersions, such as cans or bottles, so that the dispersions cannot be kept in a uniform condition; (4) the dispersion is divided into a supernatant layer of a dispersing medium and a precipitation layer of fine particles; (5) the concentration of fine particles is lower at the upper portion of the dispersion and higher at the lower portion; and (6) the dispersion gets easy to be gelled.

There may also be such problems as follows: (7) a dispersion cannot easily be obtained owing to air taken in the fine particles, for example, when alumina particles of 5 to 100 nm in primary average particle size are to be dispersed in an aqueous dispersing medium so that the concentration of them can be, for example, 15 wt % or more; (8) the viscosity of the resulting dispersion is highly raised; (9) the handling of the resulting dispersion is poor; (10) it requires a longer time to disperse fine particles into a given aqueous medium, in other words, the efficiency of production is low; (11) a dispersion having a higher concentration of fine particles is hardly obtained.

Hitherto, as a material for printing images, also including letters, characters or etc., there have been employed various materials such as wood, paper, resin, metal, glass, ceramic, leather, etc. Such material is in the form of film, sheet, flat plate, curved plate, corrugated plate, woven sheet, foamed body, etc.

For example, where images are to be printed on printing materials by a inkjet-printing method, a printing material such as a thermoplastic resin film or paper has been coated with a treating agent containing a cationic polymer to thereby improve the ink adhesion.

The above-mentioned treating agent containing a cationic polymer rapidly absorbs a water content of an aqueous ink to prevent blotting the ink on the printing material and adhere the ink content onto the treating agent.

However, the above-mentioned treating agent with which the printing material was treated, was dissolved in water when the agent-treated and image-printed material was brought into contact with water. Thus, the printed image was blurred.

A printing medium having a porous material-containing ink-receptive layer formed thereon has been proposed in Japanese Patent Pre-examination Publication No. Sho60-245588 and Japanese Patent Post-examination Publication No. Hei7-2430.

Japanese Patent Pre-examination Publication No. Sho60-245588 discloses "an inkjet-recording material comprising a substrate having at least one ink-receptive layer formed thereon, said ink-receptive layer containing a porous alumina xerogel having micropores of 40 to 1,000 Å in radius". Japanese Patent Post-examination Publication No. Hei7-2430 discloses "A recording sheet comprising a transparent substrate having a porous ink-receptive layer. said ink-receptive layer being mainly comprised of psuedo-boehmite, the total volume of micropores of 100 to 1,000 Å in radius in said layer being 1 cc/gr. or less."

It is said that the above-mentioned printing materials comprising a substrate having an ink-receptive layer formed thereon, the layer containing a porous material having micropores, can absorb the water content of an aqueous ink applied thereto into the micropores, thereby preventing the blotting of the ink to improve the quality of printed image such as color intensity and coloring performance However, where the printing materials are provided thereon with the porous material-containing ink-receptive layer, by applying a coating composition comprising the porous material and a binder onto the substrate, there occur some problems based on the poor dispersibility of the porous material in the coating composition. For example, the coating composition is easily gelled, and hardly applied uniformly over the substrate. Furthermore, cracks are easily formed in the ink-receptive layer provided on the coated substrate when dried. Inkjet-printing makes an ink blot on the resulting printing materials, thus no clear image can be obtained.

For the purpose of improving the printing performance, such as a quality of image, adhesion of ink, durability of image, etc., of the printing materials, various treating agents have hitherto been applied on the surface of commercially available printing materials. Such commercially available printing materials may be a paper, OHP film or glossy paper suited for main use in inkjet-printing.

The thus surface-treated printing materials are mass-produced by applying the treating agents onto a rolled paper or resin film by coating machine, then cutting the paper and film in a predetermined size.

However, only a few kinds of materials have been used as the substrate of the printing materials, e.g., paper and resins such as PET. Many other materials have not been used, because they could not easily be obtained.

For example, where a substrate other than paper and resins. or a PPC paper or hand-made Japanese paper limited in a desired form is to be used to obtain the surface treated printing materials, users themselves must coat the treating agent onto the substrate.

Therefore, it has been demanded that the printing materials can easily be obtained, regardless of the material and form of the substrate, the surface of which is to be treated with the treating agent.

In general, methods of applying the treating agent onto the surface of substrate may be, for example, an aerosol-applying method, spraying meth rushing method, etc. Thus, the treating agent comprising a mixture of fine solid particles dispersed in a dispersing medium and an adhesive or binder is applied onto the substrate. These methods bear some problems based on the high thickening of the dispersion and poor dispersibility of fine solid particles in the dispersion. For example, there occur problems (1) to (11) mentioned above.

In addition, for example, there are prior art methods in which surface of the substrate is treated with a treating agent containing acetic acid or nitric acid as a dispersing adjuvant. No high quality printing materials can be obtained by these methods. because use of acetic acid produces malodorous products, or products which may be irregularly colored when printed thereon, on the other hand, use of nitric acid changes the substrate such as resin films in a yellow color.

To summarize, the printing materials obtained by using the prior art dispersion treating agents are not glossy, and poor in water resistance and reproducibility of dots when inkjet-printed.

SUMMARY OF THE INVENTION

The object of this invention is to overcome the problems mentioned above.

Another object of this invention is to provide an alumina dispersant capable of well dispersing alumina particles in an aqueous medium so as to avoid the thickening of the dispersion; aggregation or precipitation of the particles, and gelling of the particles after dispersion, and an alumina dispersion liquid obtained by using the dispersant.

A further object of this invention is to provide a treating agent for producing inkjet-printing materials, which is capable of providing the materials with high glossiness, high absorption and high water-resistance, and good reproducibility and roundness of dots printed on the materials by inkjet-printer, and also to provide such inkjet-printing materials.

In order to solve the above-mentioned problems, the alumina dispersant of this invention is characterized by comprising as a main component a monocarboxylic acid containing at least one nitrogen atom in a molecule thereof.

In preferred examples of the alumina dispersant, the monocarboxylic acid is:
- at least one selected from the group consisting of heterocyclic compounds having carboxylic groups bonded to heterocycles containing nitrogen atoms as a heteroatom and amino acids; or
- at least one selected from the group consisting of nicotinic acid, picolinic acid and glycine.

In order to solve the above-mentioned problems, the alumina dispersion liquid of this invention is characterized by comprising the alumina dispersant, alumina particles and an aqueous medium.

In preferred examples of the alumina dispersion liquid, the alumina dispersant contains the monocarboxylic acid of:
- at least one selected from the group consisting of heterocyclic compounds having carboxylic groups bonded to heterocycles containing nitrogen atoms as a heteroatom and amino acids; or
- at least one selected from the group consisting of nicotinic acid, picolinic acid. proline and glycine.

In order to solve one or more of the above-mentioned problems, the treating agent of this invention comprises a monocarboxylic acid containing at least one nitrogen atom in a molecule thereof, alumina fine particles dispersed in an aqueous medium, and a binder.

In preferred examples of the treating agent, the alumina/binder ratio in the solid content is within the range of 5/1 to 12/1.

In these preferred examples, the monocarboxylic acid is at least one selected from the group consisting of heterocyclic compounds containing nitrogen atoms as a heteroatom and amino acids; or
- at least one selected from the group consisting of nicotinic acid, picolinic acid, proline and glycine.

In these preferred examples, the pH of the alumina dispersion liquid is adjusted with an oxyacld, for example, within the range of 3 to 6.

In these preferred examples, the binder is an acetal resin which is acetalized with an aromatic aldehyde to have a degree of acetalization of 5 to 10 mol %, has a molecular weight of $1.5 \times 10$ or more, and is soluble in an aqueous medium.

In these preferred examples, the alumina content of the alumina dispersion is 20 wt % or more.

In these preferred examples, the average particle size of alumina primary particles is 5 to 100 nm.

In these preferred examples, the alumina particles are made by a vapor phase method.

In these preferred examples, the alumina particles are of δ-alumina.

In these preferred examples, the treating agent further contains a leveling agent, which may be a water-soluble modified silicone oil and/or a water-soluble fluorine-containing surfactant.

In order to solve the above-mentioned problems, this invention provides a inkjet-printing material characterized by having an ink-receptive layer made from the above-mentioned treating agent and a substrate supporting the ink-receptive layer.

DETAILED DESCRIPTION OF THE PREFERRED EMBODIMENTS OF THE INVENTION

Alumina Dispersant

The alumina dispersant of this invention is mainly comprised of a monocarboxylic acid containing at least one nitrogen atom in its molecule (hereinunder referred often to as a "nitrogen-containing monocarboxylic acids").

Such nitrogen-containing monocarboxylic acid is at least one monocarboxylic acid selected from the group consisting of, for example, organic compounds, organic amines, amino acids, glucides, lipids, vitamins and coenzymes, and organic reagents for analysis.

These organic compounds above may be asparagine, N-acetylglycine, o-acetoamidobenzoic acid, m-acetoamidobenzoic acid, p-acetoemidobenzoic acid, o-aminobenzoic acid (anthranilic acid), m-aminobenzoic acid, m-aminobenzoic acid, β-aminoisovaleric acid, α-aminovaleric acid, γ-aminovaleric acid, δ-aminovaleric acid, o-aminocinnamic adid, m-aminocinnamic acid, p-aminocinnamic acid, 3-aminosalicylic acid, 4-aminosalicylic acid, 5-aminosalicylic acid. 2-amiuo-3-nitrobenzoic acid, 2-amino-5-nitrobenzoic acid, 3-amino-2-nitrobenzoic acid, 3-amino-4-nitrobenzoic acids 3-amino-5-nitrobenzoic acid, 3-amino-6-nitrobenzoic acid, 4-amino-3-nitrobenzoic acid, o-aminophenylglyoxylic acid (isatic aci), 3-amino-3-phenylpropionic acid, dl-α-aminobutyric acid, L-α-aminobutyric acid, α-aminobutyric acid, β-aminobutyric acid, γ-aminobutyric acid, alanine, DL-alanine, allanturic acid, arginine, L-arginine, arecaidine, alloxanic acid, anthranilic acid, ampicilline, isonicotinic acid, isovaline, isoleucine, L-isoleucine, L-isoleucine, 3-indolylacetic acid, imidazolylic acrylic acid (urocanic acid), oxalic acid monoanilide (oxalinic acid), oxalic acid monoamide (oxamic acid), oxaluric acid, o-carboxyoxanilic acid. 6-methoxy-4-quinoline carboxylic acid (quininic acid), 4-hydroxy-2-quinoline xarboxylic acid (kynurenic acid), 3-guinoline carboxylic acid, 4-quinollne carboxylic acid (cinconic acid), 5-guinoline carboxylic acid, guanidinoacetic acid (glycocyamine), glutamine, 5-sodium glutaminate, succinic acid (succinamic acid), sarcosine, oyanoacetic acid, 2-cyanopropionic acid, 2,3-diaminobenzoic acid, 2,4-diaminobenzoic acid, 2,5-diaminobenzoic acid, 3,4-diaminobenzoic acid, 3,5-diaminobenzoic acid, cystein, citrulline, 2,4-dinitrobenzoic acid, 2,5-dinitrobenzoic acid, 2,6-dinitrobenzoic acid, 3,4-dinitrobenzoic acid, 3,5-dinitrobenzoic acid, D-(dimethylamino)benzoic acid, α-camphoramic acid, 3,5-ditodothyroxine, stachydrine, o-sulfamoylbenzoic acid, p-sulfamoylbenzoic acid, cephalolysine, serine, tyrosine, 2,3,5-triaminobenzoic acid, 3,4,5-triam:inobenzoic acid, 2,4,6-trinitrobenzoic acid, tryptophan, threonine, o-nitrobenzoic acid, m-nitrobenzoic acid, p-nitrobenzoic acid, o-nitrocinnamic acid, m-nitrocinnamic acid, p-nitrocinnamic acid, 3-nitrosalicylic acid, 5-nitrosalicylic acid, o-nitrophenylpropiolic acid, p-nitrophenylpropiolic acid, norvaline, norleucine, N-benzoylglycine (hippuric acid), histidine, hydantoic acid, 3-hydroxy-2-indole carboxylic acid, 4-hydroxy-2-quinoline carboxylic acid, hydroxyproline, 2-pyridine carboxylic acid (picolinic acid), 3-pyridine carboxylic acid (nicotinic acid), 4-pyridine carboxylic acid (isonicotinic acid), pyrrolidine monocarboxylic acid, 2-, pyrrol carboxylic acid, L-α-pyrrrolidine carboxylic acid (proline), phenylalanine, N-methylanthranilic acid, 2-phenyl-4-quinoline carboxylic acid, N-phenylglycine, phthalanilic acid, phthalamic acid, betaine, penicilline G, penicilline V, hemopyrrol carboxylic acid, o-benzoamic acid. methionine, N-methylanthranilic acid, methyl red, 6-methoxy-4-quinoline carboxylic acid, lysine, ricin, leucine, etc.

The organic amines above may be, for example, carnitin, etc.

The organic amino acids above may be, for example, azaserine, L-asparagine, L-2-aminobutyric acid, 4-aminobutyric acid, L-alanine (α-aminopropionic acid), β-alanine (β-aminopropionic acid), L-arginine, L-alloisoleucine, L-allothreonine, L-isoleucine, L-ethionine, ergothioneine. L-ornithine, L-canavanine, L-kynurenine, glucine (aminoacetic acid), L-glutamine, creatine, sarcosine, L-cysteine, L-cysteic acid, L-citrulline, β-(3,4-dihydroxyphenyl)-L-alanine, 3,5-diiodo-L-tyrosine, L-serine, L-thyroxine, L-tyrosine, L-tryptophan, L-threonine, L-norvaline, L-norleucine, valine, L-histidine, 4-hydroxy-L-proline, δ-hydroxy-L-ricin, L-phenylalanine, L-proline, L-homoserine, L-methionine, 1-methyl-L-histidine, 3-methyl-L-histidine, L-ricin, L-leucine, etc.

The glucides above may be. for example, D-muramic acid, N-acetylneuraminic acid, etc.

The coenzymes above may be, for example, biotin, pantothenic acid, etc.

The organic reagents for analysis above may be, for example, carboxyarsenazo, quinaldinic acid (2-quinoline carboxylic acid), 2-(3,5-dibromo-2-pyridylazo)-5-(dimethylamino)benzoic acid, 3-hydroxy-4-(2-hydroxy-4-sulfo-1-naphthylazo)-2-naphthoic acid, phenylhydantoic acid, rhodamine B, etc.

The nitrogen-containing monocarboxylic acid preferably used in this invention may be at least one compound selected from the group consisting of heterocyclic compounds comprising a heterocyclic structure containing nitrogen atoms as a heteroatom and having carboxyl groups bonded thereto, and amino acids.

The heterocyclic compounds above may be, for example, aromatic heterocyclic compounds such as picolinic acid, nicotinic acid, quinaldinic acid and pyrazine monocarboxylic acid, etc., 5-membered heterocyclic compounds such as pyrrolidine monocarboxylic acid, proline, etc., and amino acids.

These nitrogen-containing monocarboxylic acids are preferably a heterocyclic compound containing nitrogen atoms as a heteroatom, or amino acid, particularly preferably at least one selected from the group consisting of nicotinic acid, picolinic acid, proline and glycine.

Particularly, according to this inventions for example, the alumina dispersion liquid is prepared by mixing a binder liquid comprising a predetermined binder, additive and aqueous dispersing medium, the above-mentioned alumina dispersant and alumina particles, and this alumina dispersion liquid is applied onto a substrate, thereby forming an ink-receptive layer on the substrate. In this case, wherein the thus obtained alumina dispersion liquid is used as the treating agent for producing inkjet-printing materials, the above-mentioned monocarboxylic acid to be used is preferably at least one selected from the group consisting of nicotinic acid, picolinic acid, proline and glycine. Particularly, nicotinic acid and glycine are preferred, because they are highly safe for organs.

The alumina dispersant of this invention contains normally 50 wt % or more and 100 wt % or less of the nitrogen-containing monocarboxylic acid. Furthermore, the alumina dispersant of this invention may contain not only the nitrogen-containing monocarboxylic acid but also another component, for example, a dispersing aid, which may be an oxycarboxylic acid, inorganic acid, or organic acid which will be referred to below. Such a dispersing aid may vary depending on the kinds of alumina dispersion liquids to be prepared using the alumina dispersant.

Alumina Dispersion Liquid

The alumina dispersion liquid according to this invention comprises alumina particles, an aqueous dispersing medium, the alumina dispersant, particularly the nitrogen-containing monocarboxylic acid.

The alumina used In this invention may be, for example, anhydrous aluminum oxide, hydrous aluminum oxide. etc., particularly, anhydrous alumina such as α-alumina, δ-alumina, θ-alumina and χ-alumina, and alumina hydrate or aluminum hydroxide, such as boehmite, gibbsite, bayerite, nordstrandite, diaspore, toedite, alumina gel, etc. Thus, the "alumina" referred to in this invention includes both anhydrous and hydrous alumina.

Of these aluminas, δ-alumina is most preferred. In view of production, is preferred an alumina prepared by a vapor phase reaction, i.e., by hydrolyzing gaseous aluminum chloride in the presence of water occurring in oxygen-hydrogen reaction, at a specific temperature for such reaction.

The alumina particles used in this invention have an average primary particle size of normally 5 to 100 nm, preferably 5 to 20nm. This average primary particle size can be determined by an electron microscope.

In this invention, the alumina content in the alumina dispersion liquid is normally at most 60 wt %, preferably 10 to 60 wt %. more preferably 10 to 50 wt %, particularly preferably 15 to 50 wt %. This content allows the alumina particles to be effectively dispersed. If the alumina content is not more than 60 wt %, then the thickening or gelling caused by the shorter distance between the particles can effectively be prevented.

If the alumina content in the alumina dispersion liqjid is in the range of 10 to 60 wt %, then the viscosity of the alumina dispersion liquid can easily be adjusted to 5 to 1,000 cps, particularly 50 to 1,000 cps, and therefore, the alumina dispersion liquid is excellent in the handling.

The aqueous dispersing medium used in this invention may be an aqueous solvent containing at least one selected from the group consisting of water, methanol, ethanol, N-propyl alcohol, isopropyl alcohol, acetone, methylethyl ketone, ethyl acetate and ethylene glycol. Preferable aqueous solvent is a mixture of water and the other aqueous solvent above except water.

As the mixture of water and the other solvent, reference may be made to, for example, mixtures of water and isopropyl alcohol; water andmethanol; water and ethanol; water, ethylene glycol and isopropyl alcohol; water, ethylene glycol, isopropyl alcohol and ethyl acetate.

Furthermore, in this invention, the aqueous dispersing medium may contain an acidic material before mixed with the alumina particles and nitrogen-containig monocarboxylic acid, as long as the acidic material does not prevent the object of this invention.

The nitrogen-containing monocarboxylic acid added to the alumina dispersion liquid of this invention has already been referred to in the title—Alumina Dispersant—above. This nitrogen-containing monocarboxylic acid should easily be dissolved in the aqueous dispersing solvent or mixture of solvents mentioned above. This acid is preferably acidic or neutral, particularly preferably nicotinic acid, picolinic acid, proline and glycine.

To the alumina dispersion liquid of this invention may be added the nitrogen-containing monocarboxylic acid and/or oxycarboxylic acid to adjust the pH of the aqueous dispersing medium to normally 1.5 to 6.5, preferably 3 to 5. In preparing the inkjet-printing materials with the alumina dispersion liquid, the nitrogen-containing monocarboxylic acid should preferably be added, to the aqueous dispersing medium, in such an amount that the aqueous dispersing medium may have a pH of 3 to 6. Hereinunder, the nitrogen-containing monocarboxylic acid and the oxycarboxylic acid will often be referred merely to as "monocarboxylic acid".

The oxycarboxylic acid may be an aliphatic oxyacid such as glycolic acid, lactic acid, hydroacrylic acid, α-oxybutyric acid, glyceric acid, tartronic acid, malic acid, tartaric acid and citric acid; and salicylic acid, m-oxybenzoic acid, p-oxybenzoic acid, gallic acid, mandelic acid, and tropic acid.

The nitrogen-containing monocarboxylic acid may be added in an amount of normally 0.5 to 10 parts by weight, preferably 1 to 5 parts by weight, to 100 parts by weight of the alumina particles, for effectively dispersing the alumina particles in the alumina dispersion liquid.

As mentioned above. the other acids such as inorganic or organic acids may be added to the alumina dispersant mainly comprised of the nitrogen-containing monocarboxylic acid, as long as they do not prevent the object of this invention.

The inorganic acids may be, for example, sulfuric acid, hydrochloric acid, nitric acid, etc.

The organic acids may be, for example, water-soluble acids such as acetic acid, formic acid, benzoic acid, oxyacids, etc.

If the alumina dispersant does not contain any nitrogen-containing monocarboxylic acid but a dibasic acid such as a carboxylic acid having at least two carboxyl groups, sulfuric acid or a nitrogen-containing dicarboxylic acid, the excessive thickening or gelling of the alumina dispersion liquid cannot be prevented due to the cross-linking between aluminum atoms in the alumina dispersion liquid, thus the dispersiblity of alumina particles getting extremely poor.

If nitric acid is used in the alumina dispersant in place of the nitrogen-containing monocarboxylic acid, the inkjet-printing material treated with agent, which is prepared by mixing aluminum, the binder liquid and said alumina dispersant containing nitric acid, gets inconveniently yellow color due to oxidation by nitric acid.

If hydrochloric acid is used in the alumina dispersant in place of the nitrogen-containing monocarboxylic acid, images formed on the resulting inkjet-printing materials treated with agent, which is prepared by mixing the binder liquid, aluminum and said alumina dispersant containing said hydrochloric acid, are inconveniently changed in color or discolored. Use of hydrochloric acid is not preferred in an environmental point of view, because this acid forms toxic dioxines when destroyed by firing said resulting inkjet-printing materials, substrate of which is wood, paper or resin. Therefore, the amount of this acid used should be as small as possible.

Where acetic acid, formic acid or benzoic acid is used in the alumina dispersant in place of the nitrogen-containing monocarboxylic acid, the resulting inkjet-printing materials emit disagreeable odor. Thus any high quality products cannot be obtained. The amount of these acids should also be as small as possible.

Method of Dispersing Alumina Particles

The alumina dispersion liquid of this invention can be obtained by mixing the alumina dispersant and the aqueous dispersing medium, adjusting the resulting mixture to be acidic or neutral, and then dispersing the alumina particles into the adjusted non-alkaline mixture. Alternatively, the alumina dispersion liquid can be obtained by mixing the nitrogen-containing monocarboxylic acid, alumina particles and aqueous dispersing medium and uniformly dispersing the particles into the mixture by using a supersonic disperser, sandmill or high pressure disperser, as desired.

According to this invention, the alumina particles can more efficiently be dispersed into the aqueous dispersing medium when the particles are positive-charged. The alumina particles are positive-charged when the aqueous dispersing medium is acidic or neutral. The higher the absolute potential value on the particles is, the higher the potential barrier, resulting in improved dispersion of the particles.

In general, the particles are aggregated in secondary particles, even in a dry state, in other words, "dry-aggregated". Such dry-aggregated particles should be changed in primary particles when dispersed in the aqueous dispersing medium in a stable state. To change the secondary particles in the primary particles, it is important for the dispersing medium to well wet the surface of the particles by purging air firmly adhered to the surface with the medium.

The mechanism of the effect of the nitrogen-containing monocarboxylic acid is not clear, but it appears to contribute to increase of the wettability of particles and the repulsion due to electricity or steric hindrance.

In this invention, the alumina particles can more effectively be dispersed by adjusting the pH of the aqueous dispersing medium to 1.5 to 6.5, more preferably 3 to 6. This adjustment makes it possible to avoid the thickening of the alumina dispersion liquid, aggregation and precipitation of the alumina particles and gelling of the dispersed alumina particles.

Various slurries, which vary depending upon the uses thereof, can be prepared from the alumina dispersion liquid of this invention. For examples slurries having an adjusted viscosity and/or concentration of alumina particles can be obtained by adding a proper amount of an aqueous dispersing medium to the alumina dispersion liquid as a thickened mother liquid having an alumina content of normally 10 to 6 wt %. Preferable concentration of alumina in said slurries is 3 to 6 wt %;

Use of Alumina Dispersion Liquid, particularly for Inkjet-Printing Materials

The alumina dispersion liquid of this invention is used in a treating agent for preparing inkjet-printing materials. This treating agent can be obtained by mixing the above-mentioned alumina dispersion liquid and binder liquid comprising a binder, additive and aqueous dispersing medium.

The binder may be, for example, starch and its modified products, polyvinyl alcohol and its modified products, SBR latex, NBR latex. hydroxycellulose, hydroxymethyl cellulose, carboxymethyl cellulose, polyvinyl pyrrolidone, etc. More preferably, it may be at least one resin selected from the group consisting of a polyvinyl acetal, particularly a polyvinyl acetal acetalized with an aromatic aldehyde to have a degree of acetalization of 5 to 10 mol %, which has a molecular weight of $1.5 \times 10^4$ or more, and is soluble in an aqueous medium; a polyvinyl alcohol having a saponification value of 80 to 99.8 mol %; and a polyamide which is soluble in an alcoholic solvent.

The alcoholic solvent above may be a mixture of at least one selected from the group consisting of lower aliphatic alcohols, propylene glycol, the lower aliphatic alcohols and at least one selected from the group consisting of water, trichlene, chloroform, carbon tetrachloride, benzyl alcohol, phenol, formic acid and acetic acid. Preferable alcohlic solvent may be a mixture of methanol and aqueous solvents, a mixture of methanol and trichlene, a mixture of methanol and chloroform, and so on.

The amount of the binder in the treating agent varies depending upon the thickness of the ink-receptive layer. Normally, the alumina/binder ratio by weight of solid contents is within the range of 5/1 to 12/1, preferably 5/1 to 10/1, more preferably 5/1 to 7/1.

If this ratio exceeds the upper limit. then the adhesion of the ink-receptive layer to the substrate may be reduced to such an extent that the resulting ink-printing material cannot practically be used.

If this ratio is less than the lower limit, then the ink-absorption of the inkjet-printing material is too poor to keep an ink on the material.

The treating agent of this invention may preferably contain a leveling agent.

The leveling agent used in this invention may be a water-soluble modified silicone oil and water-soluble fluorine-containing surfactant.

The water-soluble modified silicone oil may be, for example, an alcohol-modified silicone oil, ether-modified silicone oil, etc.

The water-soluble fluorine-containing surfactant may be, for example, a perfluoroalkyl sulfonate, perfluoroalkyl carboxylate, perfluorobetaine, etc.

The treating agent of this invention may contain additives other than the leveling agent, such as a pH-adjusting agent, viscosity-adjusting agent, antifoamer, defoamer, dispersion-stabilizer, whitening agent, releasing agent, etc.

The treating agent of this invention may be prepared by mixing the alumina dispersion liquid with the binder liquid, by adding the binder to the alumina dispersion, etc. The resulting treating agent may preferably be subjected to supersonic defoaming, vacuum defoaming, etc.

Inkjet-printing Materials

The inkjet-printing materials of this invention comprises the ink-receptive layer made from the treating agent of this invention and the substrate supporting the layer.

The ink-receptive layer may be made by applying the treating agent onto the substrate.

The thickness of the layer is not limited, but normally 10 to 60 $\mu$m, practically preferably 20 to 50 $\mu$m.

The substrate may be made of any materials usually available for inkjet printing, such as wood, paper, leather, glass, resins, metals, ceramics, etc.

The substrate may be in any form such as film, sheet, flat plate, curved plate, corrugated plate, woven sheet, foamed body, etc.

The treating agent of this invention may be applied onto the substrate by various methods, for example, by coating with a blade coater, reverse coater, die coater. comma coater, air-knife coater, etc. Furthermore, the treating agent can be applied with aerosol jetting, manual-pump spraying, brush coating, blade coating, rod coating, etc. Thus, the uniform ink-receptive layer can be obtained.

The thus obtained ink-receptive layer can form good printed images thereon, which have a high color strength, ink-receptivity and water resistance.

Furthermore, this layer allows an ink ingredient such as a dye to firmly adhere to the alumina particles. Therefore, the uniformly dispersed alumina particles allow the ink to make no uneven images.

An anionic ink ingredient contained in the inkjet-printing ink is negative-charged. Therefore, the ingredient is electrically attracted to the alumina particles, thereby improving the keeping of the ink or image on the material.

Furthermore, since the alumina particles used have an average primary particle size of 5 to 100 nm, the ink ingredient is allowed to rapidly and evenly adhere to the ink-receptive layer, and the water content and organic solvent of the ink are allowed to rapidly and evenly diffuse in the ink-receptive layer For example, in high-speed printing. finger-touch drying can rapidly be attained to thereby make a high quality print.

The treating agent of this invention may be not only applied directly onto the substrate but also onto a substrate surface-pretreated with a primer.

EXAMPLES

Examples 1, 3, 5 and 7

Examples 1 and 3 are working examples of this invention, and Examples 5 and 7 are comparative examples.

50 parts by weight of ion-exchange water, 10 parts by weight of isopropyl alcohol and 5 parts by weight of ethylene glycol were mixed to prepare first mixtures. The first mixtures were mixed with the additives as shown in Table 1 and in the given amounts (parts by weight) to prepare second mixtures. The second mixtures roughly were mixed with 35 parts by weight of δ-alumina particles, $Al_2O_3C$ (average primary particle size of 13 nm) made by DEGUSSA, through a butterfly mixer, and then subjected to the rapid supersonic dispersing for 20 minutes to obtain an alumina dispersion liquid.

The alumina dispersion liquid was evaluated with respect to the items as shown in Table 2. The results are also shown in Table 2. The evaluating methods are as follow:

1) Viscosity after dispersed: it was determined in one hour after supersonic dispersion by a BL-type rotaviscometer (unit: cps at 25° C.);
2) Viscosity after left to stand for one day: it was determined after supersonic dispersion by the same rotaviscometer(unit: cps at 25° C.);
3) Settling by centrifuge: the settled state of the alumina particles in the alumina dispersion liquid was observed after centrifuged at 2000 rpm for 30 minutes, and rated as follows:
   ◎ little settling was observed
   ○ a small amount of settling was observed
   Δ a large amount of settling was observed
4) Size of particles dispersed: it was determined by a laser-scattering method: and
5) Odor: it was observed by a nose and rated as follows:
   ○ little odor was observed
   Δ Odor of acetic acid was remarkably observed

Examples 2, 4, 6 and 8

Examples 2 and 4 are working examples of this invention, and Examples 6 and 8 are comparative examples.

70 parts by weight of ion-exchange water, 10 parts by weight of isopropyl alcohol and 0.3 part by weight of an antifoaming agent were mixed to prepare first mixtures. The first mixtures were mixed with the additives as shown in Table I and in the given amounts (parts by weight) to prepare second mixtures. The second mixtures roughly were mixed with 20parts by weight of γ-alumina particles, UA-5605 (average primary particle size of 50 nm) made by Showa Denko, K.K., through a butterfly mixer, and then subjected to the rapid supersonic dispersing for 20 minutes to obtain an alumina dispersion liquid.

The alumina dispersion liquid was evaluated with respect to the items as shown in Table 2. The results are also shown in Table 2. The evaluating methods are identical with those in Examples 1, 3, 5 and 7.

TABLE 1

| Example | 1 | 2 | 3 | 4 | 5 | 6 | 7 | 8 |
|---|---|---|---|---|---|---|---|---|
| Nicotinic acid (a) | 2.0 | 1.0 | 1.0 | 1.5 | | | | |
| Glycine (a) | | | 0.5 | | | | | |
| Lactic acid (b) | | 1.0 | 0.5 | | | | | |
| Glycolic acid (b) | | | | 0.5 | | | | |
| Sulfuric acid | | | | | | | | 0.8 |
| Acetic acid | | | | | 0.2 | | 1.0 | |
| Benzoic acid | | | | | | 2.0 | | |
| Glutamic acid (c) | | | | | | | | 2.0 |

(a) nitrogen-containing monocarboxylic acid,
(b) oxyacid,
(b) nitrogen-containing dicarboxylic acid

TABLE 2

| Example | 1 | 2 | 3 | 4 | 5 | 6 | 7 | 8 |
|---|---|---|---|---|---|---|---|---|
| Viscosity after dispersed | 64 | 62 | 81 | 55 | X | 75 | X | 260 |
| Viscosity after left to stand for one day | 68 | 75 | 90 | 60 | X | 200 | X | 1100 |
| Settling by centri-fuge | ◎ | ◎ | ◎ | ◎ | Δ | ○ | Δ | Δ |
| Size of particles dispersed | 95.8 | 242.0 | 102.5 | 205.7 | X | 382.5 | X | 526.5 |
| Odor | ○ | ○ | ○ | ○ | ○ | Δ | ○ | ○ |
| PH | 4.5 | 4.4 | 4.5 | 4.0 | 4.5 | 4.6 | 4.2 | 3.8 |

X: not dispersed and hence not determined

Example 9

This Is a working example of this invention.

To an aqueous mixing solvent comprising 35 parts by weight of water, 20 parts by weight of isopropyl alcohol and 10 parts by weight of ethylene glycol was added 2 parts by weight of nicotinic acid. The resulting mixture was roughly mixed with 35 parts by weight of δ-alumina particles. $Al_2O_3C$ (average primary particle size of 13 nm) made by DEGUSSA, through a butterfly mixer. and then subjected to the rapid dispersing with a beads mill to obtain an alumina dispersion liquid. The viscosity of the alumina dispersion liquid was 120 cps at 20° C. (BL-type rotaviscometer) .

Then, to 100 parts by weight of the alumina dispersion liquid was added 60 parts by weight of a polyvinyl acetal resin, Esleck KX-1, made by Sekisui Chemical Co., Ltd. (Degree of acetalization: 8 mol %; molecular weight: $18×10^4$; purity: 8 wt %) Furthermore, 0.1 part by weight of a modified silicone oil, SP8427, made by Toray-Dow Corning, was added thereto. The resulting mixture was subjected to dispersing with a mixer to obtain an agent for treating inkjet-printing materials. This treating agent had a viscosity of 600 cps as determined at 20° C. with a BL-type rotaviscometer. This treating agent was left to stand at a normal temperature for 30 days. On the 30th date. the viscosity of the treating agent was determined in the same manner as mentioned above. The results are shown in Table 3.

An inkjet-printing glossy film was prepared by using the treating agent obtained above. The film substrate used was white PET. D534 (polyethylene terephthalate, made by ICI) and of 100 μm thick. The treating agent was coated by a doctor blade on the film substrate. The coated film was initially dried in a constant temperature bath at 50° C. for 3 minutes, and then dried at 120° C. for 2 minutes, so as to give a dried coating thickness of 35 μm. Thus, the inkjet-printing glossy film was obtained.

The glossy film was color printed by Inkjet-Printer PM-700C made by Epson Corporation, and evaluated in terms of the following items:

Evaluation of Printing:

1) Reflection density of color inks: each of solid printed yellow, magenta, cyan and black inks was determined by Macbeth Densitometer (RD-1255);

2) Ink absorption: a PPC paper was pressed against a printed ink directly after printing, and it was observed whether an excess of the Ink transferred to the paper. and the results were rated as follows:
   ⊚ not transferred
   ○ a small amount of black ink only transferred
   Δ amounts of black, yellow, magenta and cyan inks transferred 3) Adhesion of ink: printed Ink was brought into contact with a flowing water of 30° C., at room temperature in an hour after printing, and it was observed whether the ink flowed, and the results were rated as follows:
   ⊚ not flowed
   ○ black ink only flowed
   Δ whole flowed 4) Roundness of ink dot: dots were observed by a microscope, and the results were rated as follows:
   ○ approximately round
   X not round Evaluation of Coated Ink-receptive Layer:

5) Glossiness of ink-receptive layer: determined at 75° by JIS K-7150, and dissolving and peeling of layer were observed.

6) Water resistance of ink-receptive layer: the layer was dipped in water of 30° C. for 5 minutes, and dissolving and peeling of layer were observed, and the results were rated as follows:
   ⊚ not dissolved
   ○ slightly dissolved, but not peeled from the PET film 7) Yellowing of ink-receptive layer: reduction of whiteness under irradiation with carbon arc in an amount of $4\times10^4 kJ/m^2$ (60° C., RH 85%) was observed by a fademeter, and the results were rated as follows;
   ⊚ reduction of whiteness: 5% or less
   ○ reduction of whiteness: 5 to 10%
   X reduction of whiteness: 10% or more 8) Odor of ink-receptive layer: observed by a nose, and the results were rated as follows:
   ⊚ no odor
   ○ slight odor
   X strong odor Evaluation of Stability of Treating Agent:

9) Stability of treating agent: the treating agent was left to stand for one month after prepared, and the stability was rated in terms of glossiness for evaluating the occurring of cracks of a layer when provided on a white PET film as in Example 9, the degree of leveling and the aggregation of alumina particles.

The alumina particles are aggregated and the viscosity of the alumina dispersion liquid is increased as the dispersibility of the alumina dispersion liquid is reduced. The aggregation of alumina particles causes cracks to be formed in the layer applied on the white PET film, and the increase of viscosity makes the leveling poor. The total evaluation of these matters is made suitably in terms of the glossiness of the applied layer. For example, the formation of cracks causes diffused reflection at the cracks and, as a result, the layer loses glossiness. Furthermore, poor leveling causes the surface of the layer to be uneven, which reduces the glossiness of the layer. The glossiness of the layer applied of the treating agent stored for 30 days after the preparation thereof is a good evaluation of the stability of the treating agent.

Example 10

This is a working example of this invention.

Example 9 was repeated, except that 1 part by weight of nicotinic acid and 0.5 part by weight of glycine were used in place of 2 parts by weight of nicotinic acids and lactic acid was used as the oxyacid. The results of evaluation are shown in Table 3.

Example 11

This is a working example of this invention.

Example 9 was repeated, except that 35 parts by weight of γ-alumina, UA-5605(made by Showa Denko, K.K.; average primary particle size: 50 nm) was used in place of 35 parts by weight of δ-alumina. The results of evaluation are shown in Table 3.

Example 12

This is a working example of this invention.

Example 9 was repeated, except that 1 part by weight of nicotinic acid was used in place of 2 parts by weight of nicotinic acid, 0 5 part by weight of glycolic acid, and 01 part by weight of a leveling agent, "Megafac F- 110", made by Dainippon Ink and Chemicals, Inc., was added. The results of evaluation are shown in Table 3.

TABLE 3

| Dispersion adjuvant | Ex. 9 | Ex. 10 | Ex. 11 | Ex. 12 |
|---|---|---|---|---|
| Nitrogen-containing Monocarboxylic acid | | | | |
| Nicotinic acid | 2 | 1 | 2 | 1 |
| Glycine | | 0.5 | | |
| Oxyacid | | | | |
| Lactic acid | | 0.5 | | |
| Glycolic acid | | | | 0.5 |
| Organic acid | | | | |
| Acetic acid | | | | 02 |
| Alumina | | | | |
| δ-alumina | ○ | ○ | | |
| γ-alumina | | | ○ | ○ |
| Binder | KX-1 | KX-1 | KX-1 | KX-1 |
| pH | 4.5 | 4.5 | 4.5 | 4 |
| Initial viscosity | 120 | 110 | 280 | 250 |
| Viscosity after mixed with a resin | 600 | 600 | 780 | 750 |
| Viscosity in 30 days at normal temp. | 620 | 650 | 800 | 760 |
| Glossiness | 94 | 93 | 88 | 86 |
| Water resistance | ⊚ | ⊚ | ⊚ | ⊚ |
| Ink absorption | ⊚ | ⊚ | ⊚ | ⊚ |
| Adhesion of ink | ⊚ | ⊚ | ⊚ | ⊚ |
| Yellowing of coated layer | ○ | ○ | ○ | ○ |

TABLE 3-continued

| Dispersion adjuvant | Ex. 9 | Ex. 10 | Ex. 11 | Ex. 12 |
|---|---|---|---|---|
| Stability of treating agent (glossi.) | 93 | 90 | 87 | 84 |
| Reflection Density | | | | |
| Yellow(Y) | 0.94 | 0.92 | 0.85 | 0.84 |
| Magenta(M) | 1.41 | 1.4 | 1.36 | 1.36 |
| Cyan(CY) | 0.88 | 0.87 | 0.87 | 0.87 |
| Black(Bk) | 2.32 | 2.33 | 2.21 | 2.2 |
| Roundness of dot | ○ | ○ | ○ | ○ |
| Odor | ◉ | ◉ | ◉ | ○ |

Example 13

This is a working example of this invention.

An alumina dispersion liquid was obtained in such a manner as shown in Example 9.

30 parts by weight of a polyvinyl acetal resin, KW-10, made by Sekisui Chemical Industry Co., Ltd. (Degree of acetalization: 8 mol %; molecular weight: 33000; purity: 18 wt %) was added to 100 parts by weight of the alumina dispersion liquid above. Furthermore, 0.1 part by weight of a modified silicone oil, SF8427, made by Toray-Dow Corning, was added thereto. The resulting mixture was subjected to dispersing with a mixer to obtain an agent for treating inkjet-printing materials. This treating agent had a viscosity of 450 cps as determined at 20° C. with a BL-type rotaviscometer. This treating agent was left to stand at a normal temperature for 30 days. On the 30th date, the viscosity of the treating agent was determined in the same manner as mentioned above. The results are shown in Table 4.

An inkjet-printing glossy film was obtained with the thus obtained treating agent in the same manner as shown in Example 9. The evaluation was made also in the same manner as shown in Example 9. The results are shown in Table 4.

Example 14

This is a working example of this invention.

An alumina dispersion liquid was obtained in the same manner as shown in Example 10.

Example 13 was repeated, except that 50 parts by weight of polyvinyl alcohol 217 made by Kuraray Co. Ltd. was added in place of the polyvinyl acetal resin to 100 parts by weight of the alumina dispersion liquid obtained above The evaluation was made in the same manner as shown in Example 9. The results are shown in Table 4.

Example 15

This is a working example of this invention.

Example 10 was repeated, except that a polyvinyl acetal resin, KX-5. prepared by using an aromatic aldehyde, made by Sekisui Chemical Industry Co., Ltd. (Degree of acetalization: 9 mol %: molecular weight: 110000; purity: 8 wt %) was used in place of the polyvinyl acetal resin used in Example 10. The evaluation was made in the same manner as shown in Example 9. The results are shown in Table 4.

Example 16

This is a working example of this invention.

Example 10 was repeated, except that a polyvinyl acetal resin, KKX-5, prepared by using an aromatic aldehyde, made by Sekisui Chemical Industry Co., Ltd. (Degree of acetalization: 5.1 mol; molecular weight: 140000; purity: 8 wt %) was used in place of the polyvinyl acetal resin used in Example 10. The evaluation was made in the same manner as shown in Example 9. The results are shown in Table 4.

Example 17

This is a working example of this invention.

Example 9 was repeated, except that γ-alumina particles, AKP-G015 (average primary particle size: 100 nm or smaller), prepared by hydrolyzing aluminum alkoxide, made by Sumitomo Chemical Co., Ltd. was used in place of δ-alumina particles. The evaluation was made in the same manner as shown in Example 9. The results are shown in Table 4.

TABLE 4

| Dispersion adjuvant | Ex. 13 | Ex. 14 | Ex. 15 | Ex. 16 | Ex. 17 |
|---|---|---|---|---|---|
| Nitrogen-containing Monocarboxylic acid | | | | | |
| Nicotinic acid | 2 | 2 | 2 | 2 | 2 |
| Glycine | | | | | |
| Oxyacid | | | | | |
| Lactic acid | | | | | |
| Glycolic acid | | | | | |
| Organic acid | | | | | |
| Acetic acid | | | | | |
| Benzoic acid | | | | | |
| Alumina | | | | | |
| δ-alumina | ○ | | ○ | ○ | |
| γ-alumina | | ○ | | | |
| AKP-G015 | | | | | ○ |
| Binder | KW-10 | PVA 217 | KX-5 | HKX-5 | KX-1 |
| pH | 4.5 | 4.5 | 4.5 | 4.5 | 4.7 |
| Initial Viscosity | 120 | 280 | 120 | 120 | 170 |
| Viscosity after mixed with a resin | 500 | 400 | 450 | 620 | 670 |
| Viscosity in 30 days at normal temp. | 550 | 410 | 500 | 650 | 690 |
| Glossiness | 80 | 81 | 93 | 92 | 82 |
| Water resistance | ◉ | ○ | ◉ | ◉ | ◉ |
| Ink absorption | ○ | ○ | ◉ | ◉ | ◉ |
| Adhesion of ink | ○ | ○ | ◉ | ◉ | ◉ |
| Yellowing of coated layer | ○ | ○ | ○ | ○ | ○ |
| Stability of treating agent (glossi.) | 80 | 81 | 91 | 89 | 82 |
| Reflection Density | | | | | |
| Yellow(Y) | 0.82 | 0.86 | 0.92 | 0.9 | 0.82 |
| Magenta(M) | 1.36 | 1.36 | 1.4 | 1.36 | 1.34 |
| Cyan(CY) | 0.87 | 0.87 | 0.88 | 0.87 | 0.87 |
| Black(Bk) | 2.2 | 2.17 | 2.32 | 2.25 | 2.2 |
| Roundness of dot | ○ | ○ | ○ | ○ | ○ |
| Odor | ◉ | ◉ | ◉ | ◉ | ◉ |

Example 18

This is a comparative example.

Example 9 was repeated, except that 2 parts by weight of acetic acid was used in place of 2 parts by weight of nicotinic acid. The results of the evaluation are shown in Table 5.

Example 19

This is a comparative example.

Example 9 was repeated. except that 2 parts by weight of benzoic acid was used in place of 2 parts by weight of nicotinic acid. The results of the evaluation are shown in Table 5.

Example 20

This is a comparative example.

Example 9 was repeated. except that 2 parts by weight of glutamic acid as the nitrogen-containing dicarboxylic acid was used in place of 2 parts by weight of nicotinic acid. The results of the evaluation are shown in Table 5.

Example 21

This is a comparative example.

Example 9 was repeated. except that 1 parts by weight of sulfuric acid was used in place of 2 parts by weight of nicotinic acid. The results of the evaluation are shown in Table 5.

Example 22

This is a comparative example.

Example 9 was repeated, except that α-alumina particles having an average primary particle size of 3.5μm or less. The results of the evaluation are shown in Table 5.

TABLE 5

| Dispersion adjuvant | Ex. 18 | Ex. 19 | Ex. 20 | Ex. 21 | Ex. 22 |
|---|---|---|---|---|---|
| Dicarboxylic acid | | | | | |
| Glutamic acid | | | 2 | | |
| Monocarboxylic acid | | | | | |
| Nicotinic acid | | | | | |
| Inorganic acid | | | | | |
| Sulfuric acid | | | | 1 | |
| Organic acid | | | | | |
| Acetic acid | 2 | | | | 2 |
| Benzoic acid | | 2 | | | |
| Alumina | | | | | |
| δ-alumina | ○ | ○ | ○ | ○ | |
| γ-alumina | | | | | |
| α-alumina | | | | | ○ |
| Binder | KX-1 | KX-1 | KX-1 | KX-1 | KX-1 |
| PH | 4.6 | 4.5 | 3.8 | 4.3 | 4.3 |
| Initial viscosity | 85 | 3200 | 260 | 1000 | 5000 |
| Viscosity after mixed with a resin | 480 | >15 | 2000 | 2600 | 8200 |
| Viscosity in 30 days at normal temp. | 2000 | " | >15 | >15 | >10000 |
| Glossiness | 93 | (a) | 62 | 65 | 52 |
| Water resistance | ⊚ | (a) | ⊚ | ○ | ○ |
| Ink absorption | ⊚ | (a) | Δ | ○ | Δ |
| Adhesion of ink | ⊚ | (a) | Δ | ○ | Δ |
| Yellowing of coated layer | ○ | (a) | Δ | X | Δ |
| Occurrence of cracks | 77 | (a) | (b) | (b) | (c) |
| Reflection | | | | | |

TABLE 5-continued

| Dispersion adjuvant | Ex. 18 | Ex. 19 | Ex. 20 | Ex. 21 | Ex. 22 |
|---|---|---|---|---|---|
| Density | | | | | |
| Yellow(Y) | 0.8 | — | 0.61 | 0.55 | 0.5 |
| Magenta(M) | 1.34 | — | 1.1 | 0.65 | 1.01 |
| Cyan(CY) | 0.87 | — | 0.7 | 0.87 | 0.64 |
| Black(Bk) | 2.19 | — | 1.18 | 1.77 | 1.76 |
| Roundness of dot | ○ | — | X | X | X |
| Odor | X | — | ○ | ○ | X |

(a): not observed;
(b): not observed, gelled;
(c): separated, uneven

What is claimed is:

1. An alumina dispersion composition liquid which consists essentially of an alumina dispersant consisting essentially of a heterocyclic compound having a heterocyclic structure containing a nitrogen atom as heteroatom and having a carboxyl group bonded thereto, optionally a binder, alumina particles and an aqueous dispersing medium.

2. The composition recited in claim 1, wherein said heterocyclic compound is at least one selected from the group consisting of nicotinic acid, picolinic acid, and proline.

3. The composition recited in claim 2, wherein said heterocyclic compound is nicotinic acid.

4. A composition according to claim 1, comprising said binder.

5. The composition recited in claim 4, wherein the alumina/binder ratio by weight of solid contents is within the range of 5/1 to 12/1.

6. The composition recited in claim 4, wherein said alumina dispersion liquid has a pH value adjusted with an oxyacid.

7. The composition recited in claim 4, having a pH value of 3 to 6.

8. The composition recited in claim 4, wherein the content of the alumina particles in the alumina dispersion liquid is 20 wt % or more.

9. The composition recited in claim 4, wherein said alumina particles have an average primary particle size of 5 to 100 nm.

10. The composition recited in claim 4, wherein said alumina particles are produced by a vapor phase method.

11. The composition recited in claim 4, wherein said alumina particles are of δ-alumina.

12. The composition recited in claim 4, wherein said heterocyclic compound is at least one selected from the group consisting of nicotinic acid, picolinic acid, and proline.

13. The composition recited in claim 12, wherein said heterocyclic compound is nicotinic acid.

14. The composition recited in claim 4, further containing a leveling agent.

15. The composition recited in claim 14, wherein said leveling agent is a water-soluble modified silicone oil and/or water-soluble fluorine-containing surfactant.

16. An alumina dispersion composition liquid which comprises an alumina dispersant comprising a monocarboxylic acid containing at least one nitrogen atom in the molecule thereof, alumina particles, an aqueous dispersing medium, and an aqueous solvent-soluble polyvinyl acetal resin binder, acetalized with an aromatic aldehyde to have a degree of acetalization of 5 to 10 mol %, and having a molecular weight of $1.5 \times 10^4$ or more.

* * * * *